(12) United States Patent
Hao

(10) Patent No.: US 10,496,200 B2
(45) Date of Patent: Dec. 3, 2019

(54) TOUCH PANEL AND METHOD FOR MANUFACTURING THE SAME

(71) Applicant: Shenzhen China Star Optoelectronics Technology Co., Ltd., Shenzhen, Guangdong (CN)

(72) Inventor: Sikun Hao, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 142 days.

(21) Appl. No.: 15/328,960

(22) PCT Filed: Jan. 10, 2017

(86) PCT No.: PCT/CN2017/070738
§ 371 (c)(1),
(2) Date: Nov. 9, 2017

(87) PCT Pub. No.: WO2018/040473
PCT Pub. Date: Mar. 8, 2018

(65) Prior Publication Data
US 2018/0335863 A1    Nov. 22, 2018

(30) Foreign Application Priority Data
Aug. 31, 2016    (CN) .......................... 2016 1 0796322

(51) Int. Cl.
*G06F 3/041* (2006.01)
*G06F 3/044* (2006.01)
*G02F 1/1343* (2006.01)

(52) U.S. Cl.
CPC ........ *G06F 3/041* (2013.01); *G02F 1/134363* (2013.01); *G06F 3/044* (2013.01); *G06F 2203/04103* (2013.01)

(58) Field of Classification Search
None
See application file for complete search history.

(56) References Cited

U.S. PATENT DOCUMENTS

2014/0118277 A1* 5/2014 Kim ........................ G06F 3/044
345/173
2015/0185940 A1* 7/2015 Han ........................ G06F 3/044
345/174

(Continued)

FOREIGN PATENT DOCUMENTS

CN    105487717    4/2016
CN    105487735    4/2016

(Continued)

OTHER PUBLICATIONS

Office Action and Search Report, dated Jul. 11, 2018, for Chinese Patent Application No. 201610796322.0.

(Continued)

*Primary Examiner* — Joseph R Haley

(57) ABSTRACT

Disclosed are a touch panel and a method for manufacturing the same. The panel includes: a first metal layer disposed on a substrate; a first insulating layer disposed on the first metal layer; a second metal layer disposed on the first insulating layer; a second insulating layer disposed on the second metal layer; and an electrode layer disposed on the second insulating layer.

12 Claims, 3 Drawing Sheets

(56) References Cited

U.S. PATENT DOCUMENTS

2015/0268796 A1     9/2015   Tsuyuzaki et al.
2016/0048267 A1*   2/2016   Lee ...................... G06F 3/0418
                                                                               345/173

FOREIGN PATENT DOCUMENTS

| CN | 105789219 | 7/2016 |
| CN | 106155420 | 11/2016 |
| CN | 106200077 | 12/2016 |

OTHER PUBLICATIONS

Search report and Written Opinion, dated May 27, 2017, for International Application No. PCT/CN2017/070738.
Office Action and Search Report, dated Dec. 5, 2017, for Chinese Patent Application No. 201610796322.0.

* cited by examiner

TOUCH PANEL AND METHOD FOR MANUFACTURING THE SAME

CROSS-REFERENCE TO RELATED APPLICATIONS

The present application claims the priority of Chinese patent application CN 201610796322.0, entitled "Touch panel and method for manufacturing the same" and filed on Aug. 31, 2016, the entirety of which is incorporated herein by reference.

FIELD OF THE INVENTION

The present disclosure relates to the technical field of touch control, and particularly to a touch panel and a method for manufacturing the same.

BACKGROUND OF THE INVENTION

Liquid crystal display device is a most widely used type of flat display device at present, and has gradually become display device with a high-resolution which is widely used in various electronic devices, such as mobile phones, Personal Digital Assistants (PDAs), digital cameras, computer screens or notebook computer screens. With the development and advancement of the liquid crystal display device technology, higher requirements are put forward on display quality, appearance design, human-machine interfaces, etc., of the liquid crystal display device. The touch technology has become a hot point in technological development due to its characteristics of easy operation, high integration level, and the like.

Existing touch screens can be divided into two types, wherein one is based on one-point touch, i.e., touch and clicking of one finger each time can be recognized, and the other one is based on a multi-point touch technology. According to the multi-point touch technology, a task can be decomposed into work in two aspects. In a first aspect, signals of multiple points are collected. In a second aspect, the meaning of each signal is determined. The so-called gesture recognition can be realized, i.e., clicking and touch actions made by five fingers of a person can be recognized at the same time.

However, in a touch screen in the prior art, touch electrodes are generally arranged under pixel electrodes, thus influencing the touch sensitivity of the panel. Moreover, in a panel in the prior art, drive lines pass through a frame of a liquid crystal display device, and thus a width of the frame is increased. There are drive lines in X direction and sensing lines in Y direction in a display area, which results in the existence of a mass of cross lines in the display area. As a result, parasitic capacitors are increased, and an opening ratio of pixels is adversely affected.

SUMMARY OF THE INVENTION

In order to solve the above problems, the present disclosure provides a touch panel and a method for manufacturing the same so as to realize compatibility of In-Plane Switching (IPS) structure and built-in touch electrodes and reduce a width of a frame.

According to a first aspect, the present disclosure provides a touch panel, which comprises: a first metal layer, disposed on a substrate to form gates of thin-film transistors;

a first insulating layer, disposed on the first metal layer;

a second metal layer, disposed on the first insulating layer to form data lines, and sources and drains of the thin-film transistors;

a second insulating layer, disposed on the second metal layer; and an electrode layer, disposed on the second insulating layer to form pixel electrodes and common electrodes, wherein the common electrodes serve as touch electrodes during touch scanning According to one embodiment of the present disclosure, drive leads and sensing leads are disposed at the first metal layer, and connected to the touch electrodes by means of via holes.

According to one embodiment of the present disclosure, drive leads and sensing leads are arranged at the second metal layer, and connected to the touch electrodes through via holes.

According to one embodiment of the present disclosure, the drive leads are arranged in parallel with the sensing leads.

According to one embodiment of the present disclosure, one sensing lead senses two adjacent columns or rows of touch electrodes, and a plurality of drive leads drive touch electrodes in a same row or column.

According to one embodiment of the present disclosure, one sensing lead senses two adjacent columns or rows of touch electrodes, and one drive lead drives one touch electrode.

According to one embodiment of the present disclosure, during touch scanning procedure of the panel, the drive leads are used for leading in touch driving signals, and the sensing leads are used for leading out touch driving signals.

According to one embodiment of the present disclosure, during display driving procedure of the panel, the drive leads and the sensing leads serve as external leads of the common electrodes.

According to a second aspect, the present disclosure provides a method for manufacturing a touch panel, which comprises:

forming a first metal layer on a substrate to form gates of thin-film transistors, drive leads and sensing leads;

forming a first insulating layer on the first metal layer;

forming a second metal layer on the first insulating layer to form data lines, and sources and drains of the thin-film transistors;

forming a second insulating layer on the second metal layer;

forming an electrode layer on the second insulating layer to form pixel electrodes and common electrodes; and forming via holes in the electrode layer through which the common electrodes are connected to the drive leads and the sensing leads respectively.

According to a third aspect, the present disclosure further provides a method for manufacturing a touch panel, which comprises:

forming a first metal layer on a substrate to form gates of thin-film transistors;

forming a first insulating layer on the first metal layer;

forming a second metal layer on the first insulating layer to form data lines, sources and drains of the thin-film transistors, drive leads and sensing leads;

forming a second insulating layer on the second metal layer;

forming an electrode layer on the second insulating layer to form pixel electrodes and common electrodes; and forming via holes in the electrode layer through which the common electrodes are connected to the drive leads and the sensing leads respectively.

The following beneficial effects can be brought about according to the present disclosure.

According to the present disclosure, the IPS technology and the built-in touch technology are combined, and the common electrodes at a top layer are used as the touch electrodes. In this manner, the touch sensitivity can be improved, and the technical problem of compatibility of IPS structure and built-in touch electrodes can be solved. Moreover, the width of the frame can also be reduced.

Other advantages, objectives and features of the present disclosure will be further explained to some extent in the following description, and to some extent, become apparent for those skilled in the art based on observational study on the description below, or may be taught from the practice of the present disclosure. The objectives and other advantages of the present disclosure can be achieved through the structure specifically pointed out in the following description, claims, and the accompanying drawings.

BRIEF DESCRIPTION OF THE DRAWINGS

The accompanying drawings provide further understandings of the present disclosure or the prior art, and constitute one part of the description. The drawings are used for interpreting the present disclosure together with the embodiments, not for limiting the present disclosure. In the drawings.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It should be noted that, as long as there is no structural conflict, all the technical features mentioned in all the embodiments may be combined together in any manner, and the technical solutions obtained in this manner all fall within the scope of the present disclosure.

In a touch screen in the prior art, touch electrodes are generally arranged under pixel electrodes, thus influencing the touch sensitivity of the panel. Moreover, in a panel in the prior art, drive lines pass through a frame of a liquid crystal display device, and thus a width of the frame is increased. There are drive lines in X direction and sensing lines in Y direction in a display area, which results in the existence of a mass of cross lines in the display area. As a result, parasitic capacitors are increased, and an opening ratio of pixels is adversely affected. In order to solve the aforesaid technical problems in the prior art, the present disclosure provides a touch panel based on a combination of a mutual capacitive touch technology and an In-Plane Switching (IPS) technology.

The touch panel comprises: a first metal layer disposed on a substrate to form gates of thin-film transistors; a first insulating layer disposed on the first metal layer; a second metal layer disposed on the first insulating layer to form data lines, and sources and drains of the thin-film transistors; a second insulating layer disposed on the second metal layer; and an electrode layer disposed on the second insulating layer to form pixel electrodes and common electrodes, wherein the common electrodes serve as touch electrodes during touch scanning procedure. The touch electrodes are made of Indium Tin Oxide (ITO) or a metal, and arranged at a top layer, so that a touch sensitivity can be improved.

According to the present disclosure, the mutual capacitive touch technology and the IPS technology are combined, and the common electrodes are used as the touch electrodes during touch scanning procedure. The touch electrodes and the pixel electrodes are disposed in a same plane, whereby the touch sensitivity can be improved, the manufacturing process can be simplified, and the cost can be saved. Moreover, the problem of compatibility of the built-in touch technology and the IPS technology can be solved.

According to one embodiment of the present disclosure, drive leads and sensing leads are arranged at a first metal layer, and connected to touch electrodes through via holes.

Figure 1:
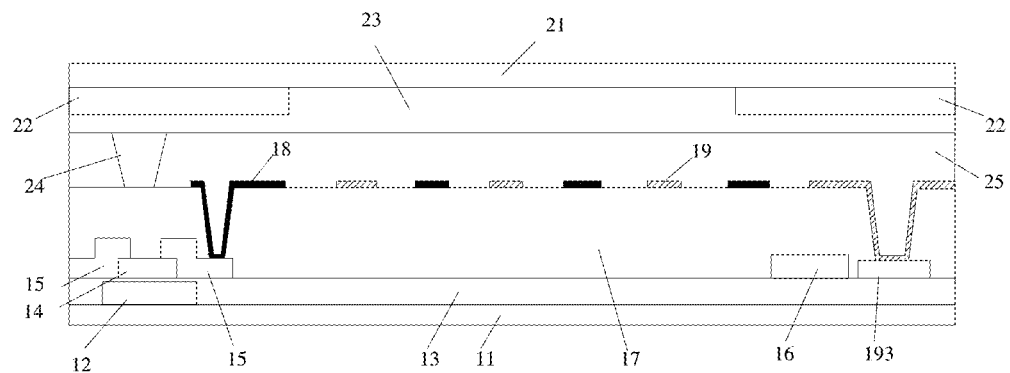
FIG. 1 is a schematic diagram of a pixel structure and drive leads during touch scanning procedure according to one embodiment of the present disclosure.

Specifically, as shown in FIG. 1, with respect to an array substrate, a first metal layer is disposed on a substrate 11. The first metal layer comprises gates 12, drive leads 191, and sensing leads 193. The drive leads 191 are not shown in FIG. 1. A first insulating layer 13 is disposed on the first metal layer. A second metal layer is disposed on the first insulating layer. The second metal layer comprises data lines 16 and sources and drains 15 of thin-film transistors. In addition, active layers 14 of the thin-film transistors are also formed before the second metal layer is formed. A second insulating layer 17 is also disposed on the second metal layer. An electrode layer is disposed on the second insulating layer. The electrode layer comprises pixel electrodes 18 and common electrodes 19. The pixel electrodes 18 and the common electrodes 19 are arranged alternately. The common electrodes serve as touch electrodes during touch scanning procedure, and the drive leads are connected to the touch electrodes through via holes. With respect to a color filter substrate, black matrices 22 are disposed on a substrate 21, a color filter 23 is disposed on the black matrices 22 and a spacer 24 is disposed on the color filter 23. Liquid crystal molecules 25 are also provided between the color filter substrate and the array substrate.

Figure 2:
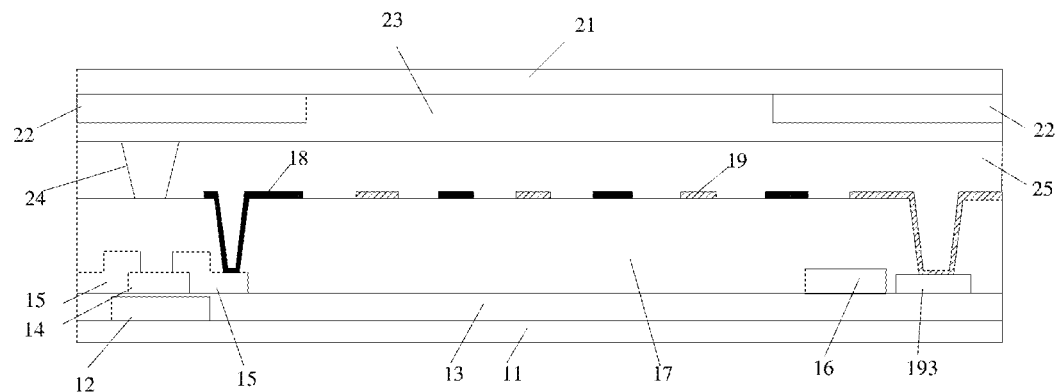
FIG. 2 is a schematic diagram of a pixel structure and sensing leads during touch scanning procedure according to one embodiment of the present disclosure.

As shown in FIG. 2, a first metal layer is disposed on a substrate 21. The first metal layer comprises gates 12, sensing leads 193, and drive leads 191. The drive leads 191 are not shown in FIG. 2. A first insulating layer 13 is disposed on the first metal layer. A second metal layer is disposed on the first insulating layer. The second metal layer comprises data lines 16, and sources and drains 15 of thin-film transistors. In addition, active layers 14 of the thin-film transistors are also formed before the second metal layer is formed. A second insulating layer 17 is also disposed on the second metal layer. An electrode layer is disposed on the second insulating layer. The electrode layer comprises pixel electrodes and common electrodes. The pixel electrodes and the common electrodes are arranged alternately. The common electrodes serve as touch electrodes during touch scanning procedure, and the sensing leads are connected to the touch electrodes through via holes.

Of course, according to one embodiment of the present disclosure, drive leads and sensing leads can also be disposed at the second metal layer, and connected to touch electrodes through via holes.

Figure 4:
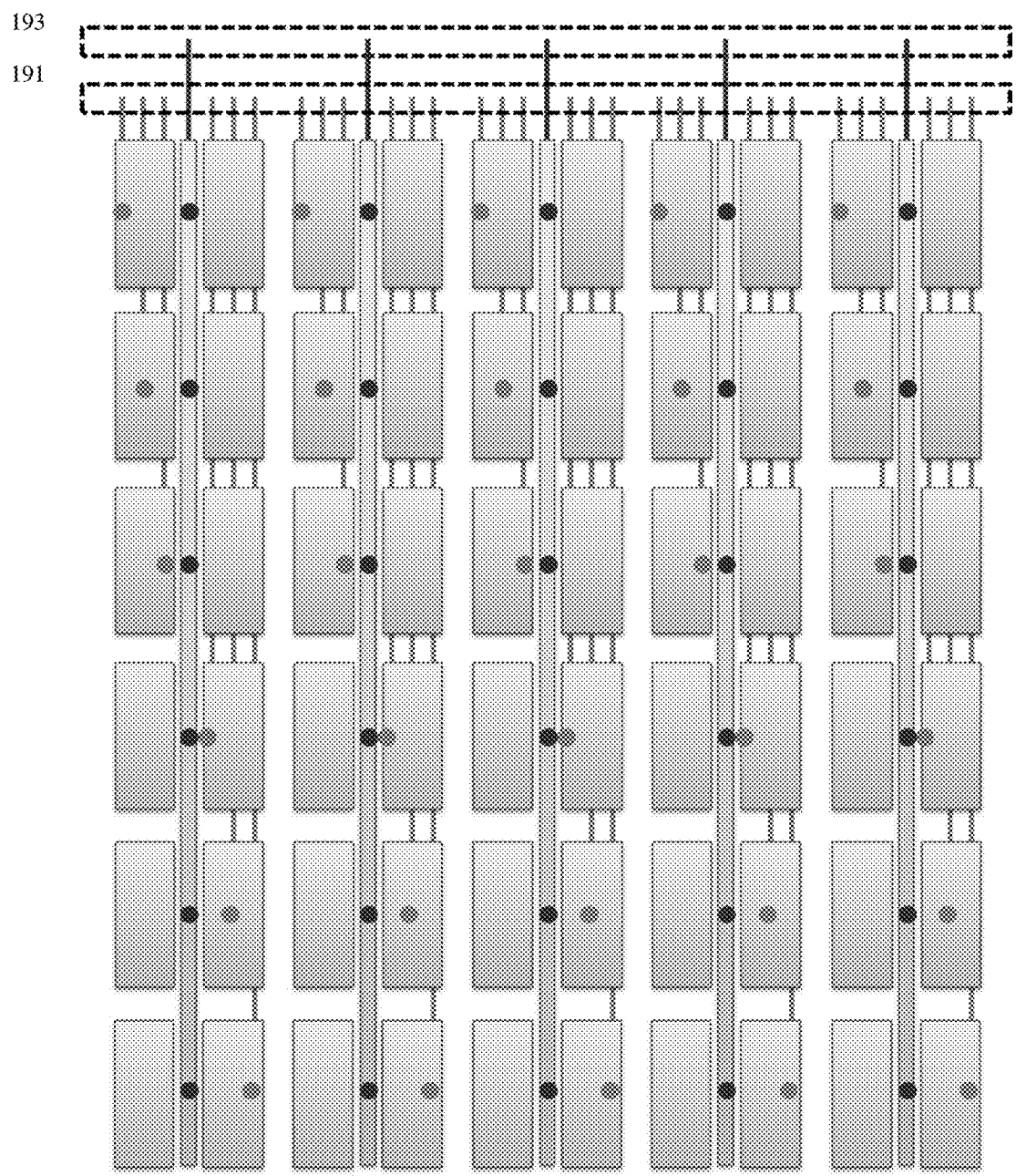
FIG. 4 is schematic diagram of a display area structure and a lead structure during touch scanning procedure according to one embodiment of the present disclosure.

According to one embodiment of the present disclosure, drive leads 191 are arranged in parallel with sensing leads 193. Specifically, as shown in FIG. 4, a plurality of drive leads 191 are arranged in parallel with one another, and a plurality of sensing leads 193 are arranged in parallel with one another. The drive leads are arranged in parallel with the sensing leads. In this way, the widths of the two sides of the panel in parallel with the drive leads can be reduced, which facilitates narrow frame design of the panel.

According to one embodiment of the present disclosure, one sensing lead senses two adjacent columns or rows of touch electrodes, and a plurality of drive leads drive touch electrodes in a same row or column. Specifically, one sensing lead 193 senses two adjacent columns of touch electrodes, and a plurality of drive leads 191 drive touch electrodes in a same row.

According to one embodiment of the present disclosure, one sensing lead senses two adjacent columns or rows of touch electrodes, and one drive lead drives one touch electrode. Specifically, as shown in FIG. 4, one sensing lead 193 senses two adjacent columns of touch electrodes, and one drive lead 191 drives one touch electrode.

According to one embodiment of the present disclosure, during touch scanning procedure of the panel, drive leads 191 are used for inputting touch driving signals, and sensing leads 193 are used for leading out touch driving signals. Specifically, as shown in FIG. 4, blocks in the figure represent touch electrodes in an Active Area (AA). Each block represents one touch electrode, and each block is not connected to another one. As shown in FIG. 4, the drive leads 191 connected to each touch electrode are made of a first metal layer or a second metal layer, and dots on the blocks represent connection positions of the drive leads 191 with the touch electrodes at a top layer. The sensing leads 193 connected to each touch electrode are made of the first metal layer or the second metal layer, and dots on the slender blocks represent connection positions of the sensing leads 193 with the touch electrodes at the top layer. The data lines and the pixel electrodes are not shown in FIG. 4.

Figure 3:
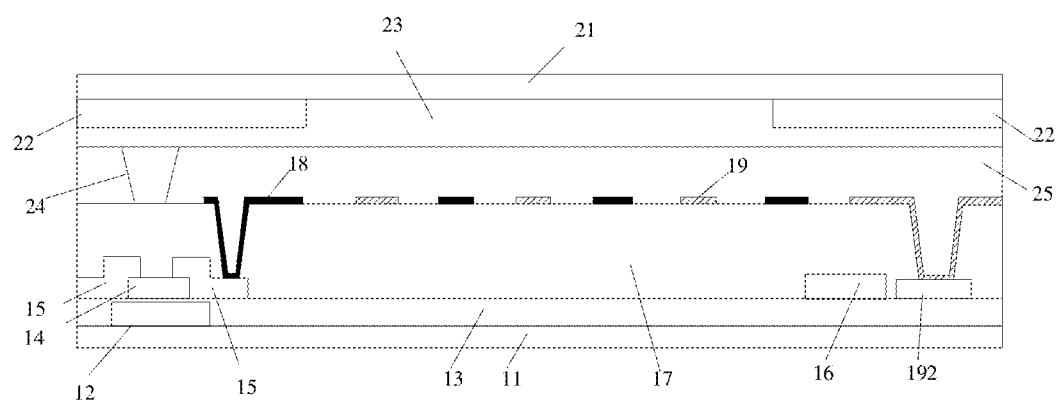
FIG. 3 is a schematic diagram of a structure at which common leads are connected with common electrodes during panel driving procedure according to one embodiment of the present disclosure.
Figure 5:
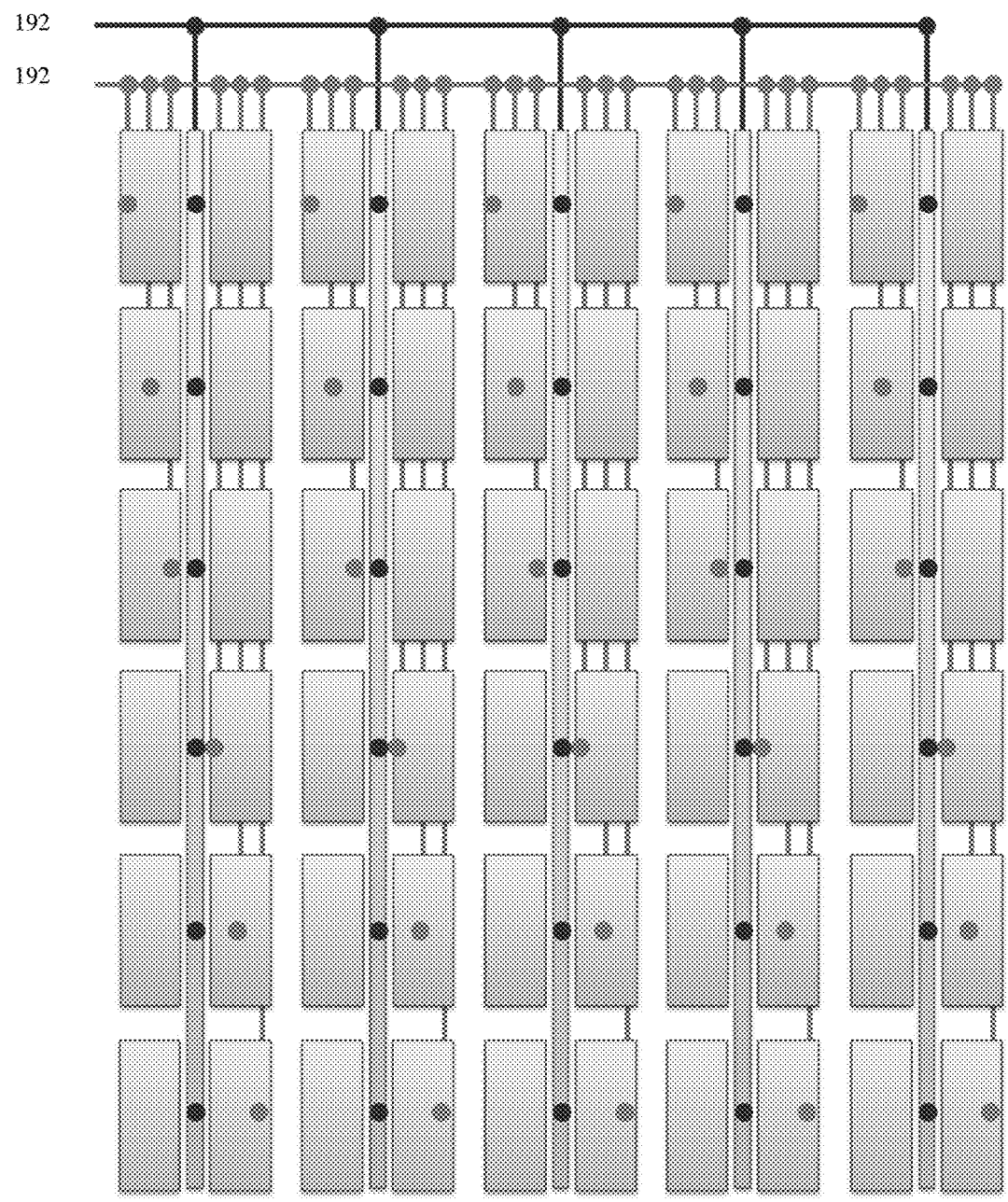
FIG. 5 is schematic diagram of a display area structure and a lead structure during panel driving procedure according to one embodiment of the present disclosure.

According to one embodiment of the present disclosure, during display driving procedure of the panel, the drive leads and the sensing leads serve as external leads of the common electrodes. Specifically, as shown in FIG. 5, blocks in the figure serve as touch electrodes during touch scanning procedure, while serve as common electrodes of the Active Area (AA) now. The drive leads 191 serve as the touch electrodes during touch scanning procedure, while serve as external leads 192 for common electrodes now, as shown in FIG. 3. Likewise, the sensing leads 193 serve as the touch electrodes during touch scanning procedure, while serve as the external leads 192 for the common electrodes now, as shown in FIG. 3.

According to another aspect of the present disclosure, a method for manufacturing a touch panel is provided, which specifically comprises the following steps. First, a first metal layer is formed on a substrate so as to form the gates of thin-film transistors, drive leads and sensing leads. Then, a first insulating layer is formed on the first metal layer. Next, a second metal layer is formed on the first insulating layer so as to form data lines, and sources and drains of the thin-film transistors. In the following, a second insulating layer is formed on the second metal layer. After that, an electrode layer is formed on the second insulating layer so as to form pixel electrodes and common electrodes. Finally, via holes are formed in the electrode layer through which the common electrodes are connected to the drive leads and the sensing leads respectively.

According to further another aspect of the present disclosure, a method for manufacturing a touch panel is also provided, which specifically comprises the following steps. First, a first metal layer is formed on a substrate so as to form the gates of thin-film transistors. Then, a first insulating layer is formed on the first metal layer. Next, a second metal layer is formed on the first insulating layer so as to form data lines, sources and drains of the thin-film transistors, drive leads and sensing leads. In the following, a second insulating layer is formed on the second metal layer. After that, an electrode layer is formed on the second insulating layer so as to form pixel electrodes and common electrodes. Finally, via holes are formed in the electrode layer through which the common electrodes are connected to the drive leads and the sensing leads respectively.

The above embodiments are described only for better understanding, rather than restricting, the present disclosure. Any person skilled in the art can make amendments to the implementing forms or details without departing from the spirit and scope of the present disclosure. The protection scope of the present disclosure shall be determined by the scope as defined in the claims.

The invention claimed is:

1. A method for manufacturing a touch panel, comprising:
    forming a first metal layer on a substrate to form gates of thin-film transistors, drive leads and sensing leads;
    forming a first insulating layer on the first metal layer;
    forming a second metal layer on the first insulating layer to form data lines, and sources and drains of the thin-film transistors;
    forming a second insulating layer on the second metal layer;
    forming an electrode layer on the second insulating layer to form pixel electrodes and common electrodes; and
    forming via holes in the electrode layer through which the common electrodes are connected to the drive leads and the sensing leads respectively.

2. A method for manufacturing a touch panel, comprising:
    forming a first metal layer on a substrate to form gates of thin-film transistors;
    forming a first insulating layer on the first metal layer;
    forming a second metal layer on the first insulating layer to form data lines, sources and drains of the thin-film transistors, drive leads and sensing leads; forming a second insulating layer on the second metal layer; forming an electrode layer on the second insulating layer to form pixel electrodes and common electrodes; and
    forming via holes in the electrode layer through which the common electrodes are connected to the drive leads and the sensing leads respectively.

3. The method according to claim 1, wherein the drive leads are arranged in parallel with the sensing leads.

4. The method according to claim 3, wherein one sensing lead senses two adjacent columns or, rows of touch electrodes, and a plurality of drive leads drive touch electrodes in a same row or column.

5. The method according to claim 3, wherein one sensing lead senses two adjacent columns or rows of touch electrodes, and one drive lead drives one touch electrode.

6. The method according to claim 1, wherein during touch scanning procedure of the panel, the drive leads are used for leading in touch driving signals, and the sensing leads are used for leading out touch driving signals.

7. The method according to claim 1, wherein during display driving procedure of the panel, the drive leads and the sensing leads serve as external leads of the common electrodes.

8. The method according to claim 2, wherein the drive leads are arranged in parallel with the sensing leads.

9. The method according to claim 8, Wherein one sensing lead senses two adjacent columns or rows of touch electrodes, and a plurality of drive leads drive touch electrodes in a. same row or column.

10. The method according to claim 8, wherein one sensing lead senses two adjacent columns or rows of touch electrodes, and one drive lead drives one touch electrode.

11. The method according to claim 2, wherein during touch scanning procedure of the panel, the drive leads are used for leading in touch driving signals, and the sensing leads are used for leading out touch driving signals.

12. The method according to claim 2, wherein during display driving procedure of the panel, the drive leads and the sensing leads serve as external leads of the common electrodes.

* * * * *